UNITED STATES PATENT OFFICE.

HARRY D. RANKIN, OF SAN FRANCISCO, CALIFORNIA, ASSIGNOR TO CORROSION EXTRACTION COMPANY, A CORPORATION.

PROCESS OF DECOMPOSING, TRANSPOSING, DISSOLVING, OR RENDERING SOLUBLE DIFFICULTLY-SOLUBLE BODIES.

1,378,485.     Specification of Letters Patent.     Patented May 17, 1921.

No Drawing.     Application filed April 24, 1916. Serial No. 93,125.

*To all whom it may concern:*

Be it known that I, HARRY D. RANKIN, a citizen of the United States, and a resident of the city and county of San Francisco and State of California, have invented a certain new and useful Process of Decomposing, Transposing, Dissolving, or Rendering Soluble Difficultly-Soluble Bodies, of which the following is a specification.

The invention relates to a process of decomposing, transposing, dissolving, internally rearranging or rendering soluble difficultly soluble or commercially insoluble bodies, such as metals, ores, minerals, concentrates, slimes, waste material or other bodies, whether in the raw state or in the roasted, fused, leached or otherwise treated state.

An object of the invention is to produce a commercial process for internally rearranging, decomposing, transforming, dissolving or rendering soluble, materials or bodies which are difficultly soluble or commercially insoluble.

A further object of the invention is to provide a process for accomplishing the above results in a short time and at a relatively small expense.

The invention possesses other advantageous features, some of which, with the foregoing, will be outlined in full in the following description, where I shall describe that species of the invention which I have selected for description. While I shall describe one specific form of my generic invention, it is to be understood that I do not limit myself to such form, because the invention may be embodied in a multiplicity of forms, each being a species of my invention.

By the process of my invention I transform, decompose, dissolve or render soluble, bodies in the natural state heretofore considered technically insoluble in sulfuric, hydrochloric or nitric acid or combinations thereof, such as cassiterite, orthoclase, muscovite, mica, magnetic oxid of iron ($Fe_3O_4$), tin dioxid ($SnO_2$), all titanites, sulfids of cobalt nickel, antimony, bismuth, and mercury, manganese oxids ($Mn_2O_3$), ($MnO_2$) etc., chromite ($FeOCr_2O_3$), silicates of copper, of nickel, of zinc, of potassium and of other metals, barium sulfate ($BaSO_4$) cinnabar (HgS) and other sulfids, as well as ignited, sintered, roasted, melted, smelted, leached or otherwise treated ores or substances, such as ignited ferric oxid, ignited alumina, ferrites, alloys, certain molecular compounds and other unusual and difficultly soluble freak bodies, all classes of which have heretofore been considered as practically insoluble.

The solvent which I employ for transforming, dissolving or rendering soluble difficultly soluble bodies is an acid, preferably sulfuric acid, although hydrochloric acid or nitric acid may be used in many instances. For instance, hydrochloric acid may be employed in the process in connection with magnetic oxid of iron, serpentine, manganese oxids, silicates of copper, of nickel, of zinc, chromite, ferrites, mica, alloys and other substances. Sulfuric acid, however, has a greater field of use in the process than any other acid, as far as I am at present aware and in the following description I shall describe the process in connection with the use of sulfuric acid, but it is to be understood that by such specific description, I do not limit the invention to sulfuric acid.

The practical value of the process lies in the fact that these difficultly soluble bodies and compounds contain simple substances, such as valuable metals, acid forming substances, alloys, oxids, salts and acids or freak compounds and other substances which have not heretofore been commercially recoverable, unless first fused, or only partly recoverable, resulting in either case in unprofitable treatment.

These difficultly soluble bodies, or I might say, commercially insoluble bodies, have heretofore been partially dissolved only in laboratory tests and the invariable analytical proceeding has been to subject the body in an open beaker or other vessel to a large excess of sulfuric acid at its boiling temperature, under normal pressure for variable periods of time, approximating several hours. The amount of acid employed, according to text books, is between 3 and 5 c. c. for one gram of material, so that a large excess of acid is always present, and under these conditions, a small proportion of the material may be dissolved. This analytical process, however, is entirely impractical for commercial use, because in such use it would require enormous vessels, large space and a great amount of time. Some of these materials, for example ($Mn_2O_3$) and ($CuSiO_3.2H_2O$) and some sulfids as those of antimony or bismuth, etc., without first fusing, are slightly and slowly soluble in a large excess of dilute sulfuric acid. Those that are, without fusing, practically not soluble at all in dilute sulfuric acid, such as ignited ferric oxid, alumina, etc., potassium and other silicates, chromites, titanates, cobalt, nickel, and other sulfids are totally lost. Some of these materials, without fusing, are slowly and slightly soluble in strong sulfuric acid as formerly applied, such as heavyspar, chromite, copper sulfid, etc. Some, without fusing, for all practical purposes are not soluble at all in strong sulfuric acid as formerly applied, such as cassiterite, orthoclase, muscovite, mercuric sulfid, etc. Even if a large excess of fuming sulfuric acid is used under the old conditions, but little more action takes place and the process is not commercial.

By the process of my invention, all of these materials are readily decomposed, dissolved or rendered soluble in economic time, in economic quantities and at economic expense without fusing or even sintering.

In accordance with my invention, I employ ordinary strong acid, sulfuric acid preferred, but instead of using a large excess of this acid, I employ approximately only the amount of acid necesary to thoroughly wet the dry ground or pulverized material to be treated, so that the mixture assumes the consistency of a semi-solid or pasty mass. A slight excess of the amount of acid necessary to thoroughly wet the material is not deleterious, but tends to slow down the reaction or decomposition, since the excess must be boiled off. Under certain circumstances less acid than the amount required to thoroughly wet the material may be employed, but under no circumstances should any material excess of acid be used when the amount of acid required to react with the metallic component of the substance is less than that required to thoroughly wet the substance then such lesser amount may be used. The maximum amount of acid employed should not be materially greater than that required to thoroughly wet the finely divided substance and preferably I employ an amount which is not greater than that required to thoroughly wet the substance. A greater amount of acid may be employed, but such amount is not advantageous, since the excess acid must be boiled off in order to bring it to the proper proportion and it is to be understood that my invention covers the use of such excess when the excess is boiled off to bring the amount of acid down to that necesary to thoroughly wet the substance. The amount of acid desirable is approximately from 1 to 1½ c. c. to 2½ grams of material, although this may vary somewhat with different materials. The mixture is then heated, preferably in a closed vessel or retort, so as to obtain conditions of temperature and pressure above the normal and preferably agitated. When heated in an open vessel, the mixture is heated to the boiling point of the acid and maintained at that temperature. When heated in a closed vessel or retort pressure is produced within the vessel and the semisolid mixture is heated to or above the boiling temperature of the acid under pressure, that is, to approximately 350° to 450° centigrade, whereby vapors of water, sulfuric acid and sulfur trioxid and sulfur dioxid or other gases are formed. A pressure of between 20 and 60 pounds per square inch is produced in the vessel. While this temperature and pressure is maintained, the mixture is preferably agitated to more readily bring all of the material under all necessary conditions by preventing agglomeration, but agitation is not essential to the commercial process. The conditions of high temperature and pressure are maintained and in a short time, the length of which varies with the materials, there will be created a very concentrated solution of sulfuric acid and some oxids, acids, salts or other changed forms of the material being acted upon. Continuing, the mixture soon assumes the consistency of a pasty mass, and when in this condition dissociation and decomposition of the heretofore considered insoluble material rapidly takes place. The high temperature and pressure and hence concentration of the acting masses before mentioned, which is obtained during the pasty mass stage, is required to pass the transition point in internal rearrangement, decomposition or change of form of the mixture or solution from a solid form to another solid or liquid form. These conditions are unattainable in the processes as heretofore practised, in which excesses of acid are employed and in which the mixtures were heated in open vessels, since under such conditions the desired temperatures were not attained and other desirable conditions were not present. Even with extremely difficultly soluble bodies like orthoclase, the internal rearrangement is not only very rapid but complete, the time varying from 30 to 90 minutes. When the substance to be treated is ground very fine, for instance to a sufficient degree to pass an 80 to 100 mesh screen, it assumes the pasty mass condition when thoroughly wetted by the acid very rapidly and under these conditions the reaction or corrosion begins when the higher temperature is reached. The corrosive or internal rearrangement action transforms the insoluble base or metallic compounds into water soluble sulfates, when sulfuric acid is used, or chlorids when hydrochloric acid is used, or nitrates when nitric acid is used, and these are then recovered by solution in water or other suitable solvent and evaporation.

I have heretofore stated that a slight excess of acid over that necessary to wet the material is not particularly deleterious, but since the reaction or decomposition seems to take place chiefly, if not entirely, only while the mixture is in a pasty or nearly dry state, any excess of water in dilute acid or of strong acid would have to be boiled off before the best action, i. e. high temperature, pressure and concentration, is obtained. I have stated that no more acid than that necessary to thoroughly wet the material should be added, but it frequently happens that this amount of acid is not sufficient to react with all of the metals, bases or soluble matter present, so that after the acid has been united with the base present, soluble material but still in an insoluble state is still present. Under such conditions, a second amount of acid is introduced, after the first digestion is completed, and the amount of this charge should be not more than, and may be less than, is necessary to thoroughly wet the material, after which the process is again carried on through the pasty mass stage. In some instances, a third digestion may be necessary. The number of digestions necessary for any particular material, however, may readily be determined when a quantitative analysis of the material is known. The final digestion, whether it be the first or second or other, is preferably continued until the mass reaches a dry state and it is then discharged from the vessel and thereafter suitably treated to separate the constituents thereof by solution in water or otherwise.

The process is carried out under pressure to secure the greatest speed, since it appears that the pressure of the vapors produced in the vessel on heating, that is, vapors of $H_2SO_4$, $SO_3$, $SO_2$, $O_2$, etc., act with the pasty mass to accelerate the reaction. This produces a very concentrated acting mass, which result is not possible in the processes as heretofore practised. The closed vessel is provided with a valve controlled outlet for the gases or vapors, so that the desired pressure within the vessel may be maintained during the reaction. The discharged vapors or gases may be condensed or absorbed in water for further use or other purposes. One form of apparatus for carrying out the process is described in a copending application, Serial No. 93128, filed in the United States Patent Office on April 24, 1916.

The results attained by this process at first appear paradoxical, that is, that with from $\frac{1}{8}$ to $\frac{1}{4}$ of the quantity of acid heretofore employed, a substantially complete internal rearrangement, decomposition or solution is accomplished, but actual practice has demonstrated the process. In the old processes there is a heterogeneous mixture of a solid molecular compound, say magnetite or feldspar, covered with a large excess of strong sulfuric acid in an open vessel and subjected to the temperature of boiling sulfuric acid, which reacts forming water and a salt or salts and, if any solution occurs, a very dilute solution of sulfates in sulfuric acid or chlorids in hydrochloric acid or nitrates in nitric acid. In the present process, there is a more heterogeneous mixture, since the solid is mixed with a small amount of sulfuric acid in a closed or partially closed vessel and subjected to pressure at the boiling point of the semisolid mixture of the acting masses, and this results in the formation of a concentrated solution of sulfates and bisulfates in concentrated sulfuric acid and possibly some sulfur trioxid, or of chlorids and of HCl and Cl if HCl is used or NO or $NO_2$ if $HNO_3$ is used, which act on the solid. The small amount of liquid present soon results in the formation of hydrates and solvates and then pasty solids, vapors or sulfuric acid and probably $SO_3$, $SO_2$, etc., whereby the solid is subjected not alone to the action of the sulfuric acid or sulfuric acid plus slight quantities of very dilute solutions or sulfates, but is subjected to the action of concentrated sulfuric acid, concentrated sulfates and bi-sulfates or other sulfate solutions, vapors of sulfuric acid and probably of sulfuric trioxid and gases of $SO_2$ and $O_2$ or other acid vapors or gases before given, in addition to the corroding action of hydrates, solvates, semi-solids, solids, etc., under increased temperature and pressure.

It will be understood that although I have in the foregoing described in detail a particular specific process of the generic process of my invention, I do not limit myself to the temperatures and pressures mentioned therein and do not limit myself beyond the terms of my several claims hereinafter made or the requirements of the prior art.

When a second charge of acid is necessary to complete the reaction, this charge may be introduced while the material is in the pasty mass stage of digestion, or the material may be heated to dryness before the second charge is introduced, and the heating of the mixture continued until it again reaches a condition of dryness. In certain instances more than two digestions may be necessary to decompose all of the decomposable material, and I do not desire to limit myself to any specified number of digestions.

I claim:

1. The process of decomposing, transforming, dissolving or rendering soluble substances heretofore considered practically insoluble, which consists in heating a mixture of the substance and an amount of acid, not materially greater than that required to thoroughly wet the substance, in a closed vessel to a sufficient temperature to boil the acid.

2. The process of decomposing, transforming, dissolving or rendering soluble substances heretofore considered practically insoluble, which consists in heating a mixture of the substance finely divided and an amount of acid, not materially greater than that required to thoroughly wet the substance, in a closed vessel to a temperature above the boiling point of the acid.

3. The process of decomposing, transforming, dissolving or rendering soluble substances heretofore considered practically insoluble, which consists in heating a mixture of the substance and an amount of sulfuric acid, not materially greater than that required to thoroughly wet the substance, in a closed vessel to a sufficient temperature to boil the sulfuric acid.

4. The process of decomposing, transforming, dissolving or rendering soluble substances heretofore considered practically insoluble, which consists in heating under pressure a mixture of the substance finely divided and an amount of sulfuric acid, not materially greater than that required to thoroughly wet the substance, to a temperature sufficiently high to boil the acid under the pressure to which it is subjected.

5. The process of decomposing, transforming, dissolving or rendering soluble substances heretofore considered practically insoluble, which consists in heating in a closed vessel a mixture of the finely divided substance and an amount of acid, not materially greater than that required to thoroughly wet the substance, to a temperature sufficiently high to boil the acid and produce a pressure in the vessel and continuing said heating until the mixture attains the consistency of a pasty mass.

6. The process of decomposing, transforming, dissolving or rendering soluble substances heretofore considered practically insoluble, which consists in heating in a closed vessel a mixture of the substance and an amount of sulfuric acid, not materially greater than that required to thoroughly wet the substance, to a temperature sufficiently high to boil the acid under the pressure produced within the vessel and maintaining the acid at the boiling temperature for a sufficient time to convert the mixture to a mixture of a solution of sulfuric acid, salts of sulfuric acid and the substance and then to a pasty mass and vapors of sulfuric acid, sulfur trioxid and water which reacts with the substance.

7. The process of decomposing, transforming, dissolving or rendering soluble substances heretofore considered practically insoluble, which consists in heating in a closed vessel whereby pressure is produced, a mixture of the finely divided substance and an amount of sulfuric acid, not materially greater than that required to thoroughly wet the substance, to a temperature sufficiently high to boil the acid under the pressure and maintaining the acid at the boiling temperature under pressure whereby vapors of sulfuric acid, sulfur trioxid and water are formed which act on the substance and continuing said heating until the mixture assumes the consistency of a pasty mass and continuing said heating until all of the substance possible is internally re-arranged.

8. The process of decomposing, transforming, dissolving or rendering soluble substances heretofore considered practically insoluble, which consists in heating in a closed vessel whereby pressure is produced, a mixture of the substance and an amount of acid not materially greater than that required to thoroughly wet the substance to a temperature sufficiently high to boil the acid under pressure until the mixture attains the consistency of a pasty mass, continuing said boiling to internally re-arrange some of the mixture and then adding another charge of acid, not materially greater than that required to thoroughly wet the mass, and continuing the boiling to and through the pasty mass stage.

9. The process of decomposing, transforming, dissolving or rendering soluble substances heretofore considered practically insoluble, which consists in heating in a closed vessel whereby pressure is produced, a mixture of the finely divided substance and an amount of acid, not materially greater than that required to thoroughly wet the substance, to a temperature sufficiently high to boil the acid, and maintaining the mixture at the boiling temperature for a sufficient time to convert the mixture to a mixture of a solution of the acid, salts of the acid and the substance, and then to the consistency of a pasty mass, continuing the heating until the acid is consumed and then adding another charge of acid, not materially greater than that required to thoroughly wet the mass, and heating the mixture through the pasty mass stage to dryness.

10. The process of decomposing, transforming, dissolving or rendering soluble substances heretofore considered practically insoluble, which consists in heating in a closed vessel a mixture of the substance and an amount of acid, not greater than that required to react with the metallic components of the substance, to a temperature sufficiently high to boil the acid under the pressure produced in the vessel.

11. The process of decomposing, transforming, dissolving or rendering soluble substances heretofore considered practically insoluble, which consists in subjecting to pressure and heating a mixture of the finely divided substance and an amount of acid, not greater than that required to react with the metallic components of the substance, to a temperature sufficiently high to boil the acid.

12. The process of decomposing, transforming, dissolving or rendering soluble substances heretofore considered practically insoluble, which consists in mixing the finely divided substance and an amount of sulfuric acid, not greater than that required to react with the metallic components of the substance and heating the mixture in a closed vessel to produce pressure within the vessel, and boil the acid under the pressure so produced.

13. The process of decomposing, transforming, dissolving or rendering soluble substances heretofore considered practically insoluble, which consists in heating in a closed vessel a mixture of the finely divided substance and an amount of sulfuric acid, not greater than that required to react with the metallic components of the substance, to a temperature sufficiently high to boil the acid under the pressure produced in the vessel and continuing said heating until the mixture attains the consistency of a pasty mass.

14. The process of decomposing, transforming, dissolving or rendering soluble substances heretofore considered practically insoluble, which consists in heating in a closed vessel a mixture of the finely divided substance and an amount of acid, not greater than that required to react with the metallic components of the substance, to a temperature sufficiently high to boil the acid under the pressure produced in the vessel, until the mixture assumes the consistency of a pasty mass, and continuing the heating of the pasty mass to dryness.

15. The process of decomposing, transforming, dissolving or rendering soluble substances heretofore considered practically insoluble, which consists in heating in a closed vessel a mixture of the substance and an amount of acid, not materially greater than that required to thoroughly wet the substance, to a temperature sufficiently high to boil the acid until the mixture reaches a substantially dry state.

16. The process of decomposing, transforming, dissolving or rendering soluble substances heretofore considered practically insoluble, which consists in heating in a closed vessel a mixture of the finely divided substance and an amount of sulfuric acid, not materially greater than that required to thoroughly wet the substance, to a temperature sufficiently high to boil the acid under the pressure produced in the vessel and continuing the heating until the mixture reaches a substantially dry state.

In testimony whereof, I have hereunto set my hand at San Francisco, California, this 15th day of April, 1916.

HARRY D. RANKIN.

In presence of—
H. G. PROST.